US008340205B2

(12) United States Patent
Poitau

(10) Patent No.: US 8,340,205 B2
(45) Date of Patent: Dec. 25, 2012

(54) METHOD AND APPARATUS FOR CORRECTING LINEAR ERROR PHASE OF AN OFDM SIGNAL

(75) Inventor: Gwenael Poitau, Montreal (CA)

(73) Assignee: Cavium, Inc., Mountain View, CA (US)

( * ) Notice: Subject to any disclaimer, the term of this patent is extended or adjusted under 35 U.S.C. 154(b) by 381 days.

(21) Appl. No.: 12/598,544

(22) PCT Filed: May 2, 2007

(86) PCT No.: PCT/IB2007/001154
§ 371 (c)(1),
(2), (4) Date: Nov. 2, 2009

(87) PCT Pub. No.: WO2008/135800
PCT Pub. Date: Nov. 13, 2008

(65) Prior Publication Data
US 2010/0142635 A1 Jun. 10, 2010

(51) Int. Cl.
*H04B 7/02* (2006.01)
(52) U.S. Cl. ........................ 375/267; 375/260
(58) Field of Classification Search ................. 375/260, 375/267; 370/208–210
See application file for complete search history.

(56) References Cited

U.S. PATENT DOCUMENTS

| 6,959,050 | B2 | 10/2005 | Baum et al. | |
|---|---|---|---|---|
| 2004/0105512 | A1 | 6/2004 | Priotti | |
| 2004/0131012 | A1* | 7/2004 | Mody et al. | 370/210 |
| 2004/0156309 | A1* | 8/2004 | Chadha et al. | 370/208 |
| 2006/0285599 | A1* | 12/2006 | Seki et al. | 375/260 |
| 2007/0268976 | A1* | 11/2007 | Brink et al. | 375/260 |

FOREIGN PATENT DOCUMENTS

| JP | 2001-069119 A | 3/2001 |
|---|---|---|
| JP | 2001-292125 A | 10/2001 |
| JP | 2006-101020 A | 4/2006 |
| WO | 9953664 A1 | 10/1999 |

OTHER PUBLICATIONS

"Timing Synchronization in High Mobility OFDM Systems", Yasamin Mostofi and Donald C. Cox, IEEE Communications Society, 2004, 2402-2406.

"Channel Estimation for OFDM Systems Based on Comb-Type Pilot Arrangement in Frequency Selective Fading Channels", Meng-Han Hsieh and Che-Ho Wei, IEEE Transactions on Consumer Electronics. vol. 44. No. 1. Feb. 1998. 217-225.

(Continued)

*Primary Examiner* — Emmanuel Bayard
(74) *Attorney, Agent, or Firm* — Cooley LLP

(57) ABSTRACT

The present invention relates to a method and an apparatus for correcting linear error phase of an OFDM signal. The method includes a step of offsetting a rotation corresponding to a back-off value of the signal. The apparatus of the present invention includes a correction module for offsetting the rotation of the signal corresponding to the back-off value.

8 Claims, 9 Drawing Sheets

OTHER PUBLICATIONS

"Timing Recovery for OFDM Transmission", Baoguo Yang, et al, IEEE Journal on Selected Areas in Communications, vol. 18, No. 11 Nov. 2000, 2278-2291.

"A Performance and Complexity Comparison of Auto-Correlation and Cross-Correlation for OFDM Burst Synchronization", Andrew Fort, et al, ICASSP, 2003, 341-344.

"ML Estimation of Timing and Frequency Offset i Multicarrier Systems", JAN-JAAP Van De Beek, et al, Lulea University of Technology, Apr. 1996.

Lim et al., Robust LS Channel Estimation with Phase Rotation for Single Frequency Network in OFDM, IEEE Transactions on Consumer Electronics, Nov. 2006, pp. 1173-1178, vol. 52, No. 4.

Pettersson, Hans, The International Search Report and the Written Opinion of the International Searching Authority, Feb. 24, 2011, 11 pgs, Prepared for International Patent Application No. PCT/IB2007/001154.

* cited by examiner

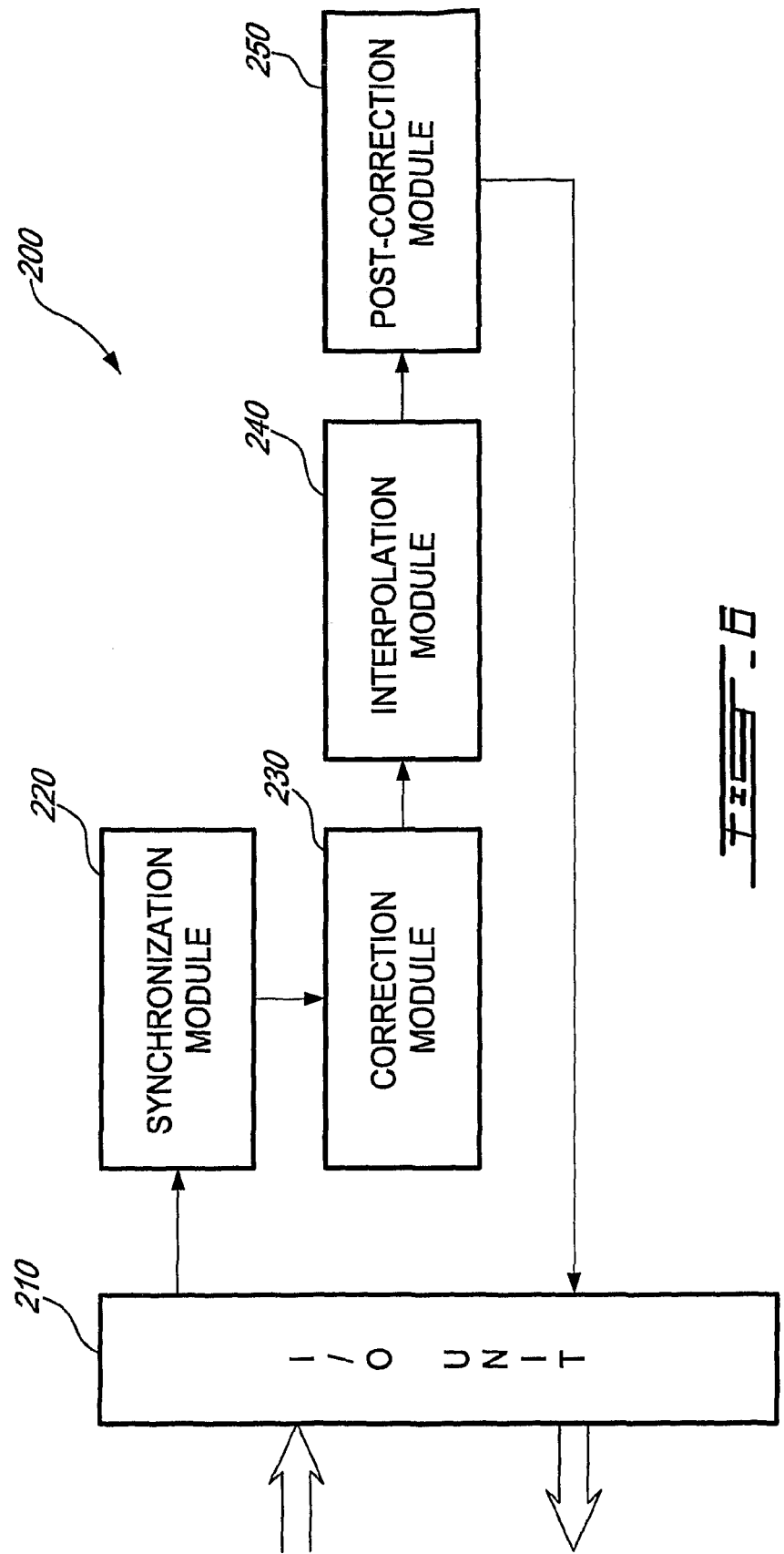

US 8,340,205 B2

METHOD AND APPARATUS FOR CORRECTING LINEAR ERROR PHASE OF AN OFDM SIGNAL

FIELD OF THE INVENTION

The present invention relates to a method and an apparatus for correcting linear error phase of an incoming signal, and more particularly to a method and apparatus for correcting linear error phase of an incoming OFDM signal.

BACKGROUND OF THE INVENTION

In the last decades, the interest toward wireless communications has greatly increased. Such an interest has pushed the development and refinement of wireless protocols and technologies. All types of wireless communications have one thing in common: they allow data transmission over the air. However, transmitting data over the air introduces issues such as interference, distortion and multipath. To overcome such issues, multiple techniques for treating received data signals have been developed in combination with more robust modulation techniques. Some of the mostly used modulation techniques include Orthogonal Frequency Division Multiplexing (OFDM) and Orthogonal Frequency Division Multiplexing Access (OFDMA).

More particularly, OFDM and OFDMA modulation techniques include embedded mechanisms to reduce the effects of multipath fading and Intersymbol interference. For example, adjustable guard intervals and introduction of cyclic prefixes in the guard intervals are used to alleviate respectively the effects of multipath fading and Intersymbol interference. Although these mechanisms prove helpful, there still remains numerous challenges with reception and handling of an OFDM signal such as linear phase error and sampling error.

Many prior art documents propose methods and apparatuses for improving the quality of data received over the air using modulation techniques such as OFDM and OFDMA. Such documents generally propose techniques for profiling the incoming signal so as to perform synchronization, adjustment, interpolation and correction. Typically, such profiling is performed while the incoming signal is being decoded.

The article titled "Timing Recovery for OFDM transmission" published in the IEEE Journal on selected areas in communications, volume 18, number 11, in November 2000 by Baoguo Yang et al. describes a two-step method profiling. The first step of this method relies on autocorrelation of the received data, and more particularly the cyclic prefixes. Once the cyclic prefixes have been located, a second step is performed in the frequency domain. Performing profiling in the frequency domain is quite complex, adds latency to the decoding process, and typically requires more power, which is not interesting for wireless applications, such as, for example, Wireless Broadband (WiBro). Furthermore, this article does not address the issues related to correction of linear phase error and sampling error.

U.S. Pat. No. 6,959,050, granted on Oct. 25, 2005 to Motorola, Inc describes a method and an apparatus for profiling while synchronizing an OFDM signal in time, frequency and per-subcarrier rotation. More particularly, that patent also describes a two-step process, in which the first step consists of performing symbol timing synchronization and fractional frequency synchronization in the time domain. Afterwards, the second step of the process proceeds with performing per-subcarrier rotation synchronization in the frequency domain. However, this patent does not address or resolve issues related to correction of linear phase error and sampling error.

There is therefore a need for a method and an apparatus for correcting linear phase error of an OFDM signal.

SUMMARY OF THE INVENTION

The present invention provides an apparatus and a method for correcting linear error phase of an OFDM signal. The apparatus and method of the present invention corrects the linear error phase prior to interpolating the OFDM signal.

For doing so, an aspect of the present invention relates to a method for correcting linear error phase of an OFDM signal. The linear error phase is corrected by offsetting a rotation of the signal corresponding to a back-off thereof.

In another aspect, the present invention is directed to an apparatus for correcting linear error phase of an OFDM signal. The apparatus includes a correction module for offsetting a rotation of the signal corresponding to a back-off thereof.

BRIEF DESCRIPTION OF THE DRAWINGS

In the following description, the following drawings are used to describe and exemplify the present invention:

FIG. 6 is a block diagram of an apparatus in accordance with an aspect of the present invention;

DETAILED DESCRIPTION OF THE INVENTION

The present invention relates to a method and an apparatus for correcting linear error phase of an OFDM signal. The present invention is characterized by many advantages over prior art solutions. First and foremost, the present invention corrects effects of linear error phase of the OFDM signal in a simple and efficient manner. For doing so, the present invention offsets a rotation of the signal corresponding to a back-off thereof, prior to interpolating the OFDM signal.

Figure 1:
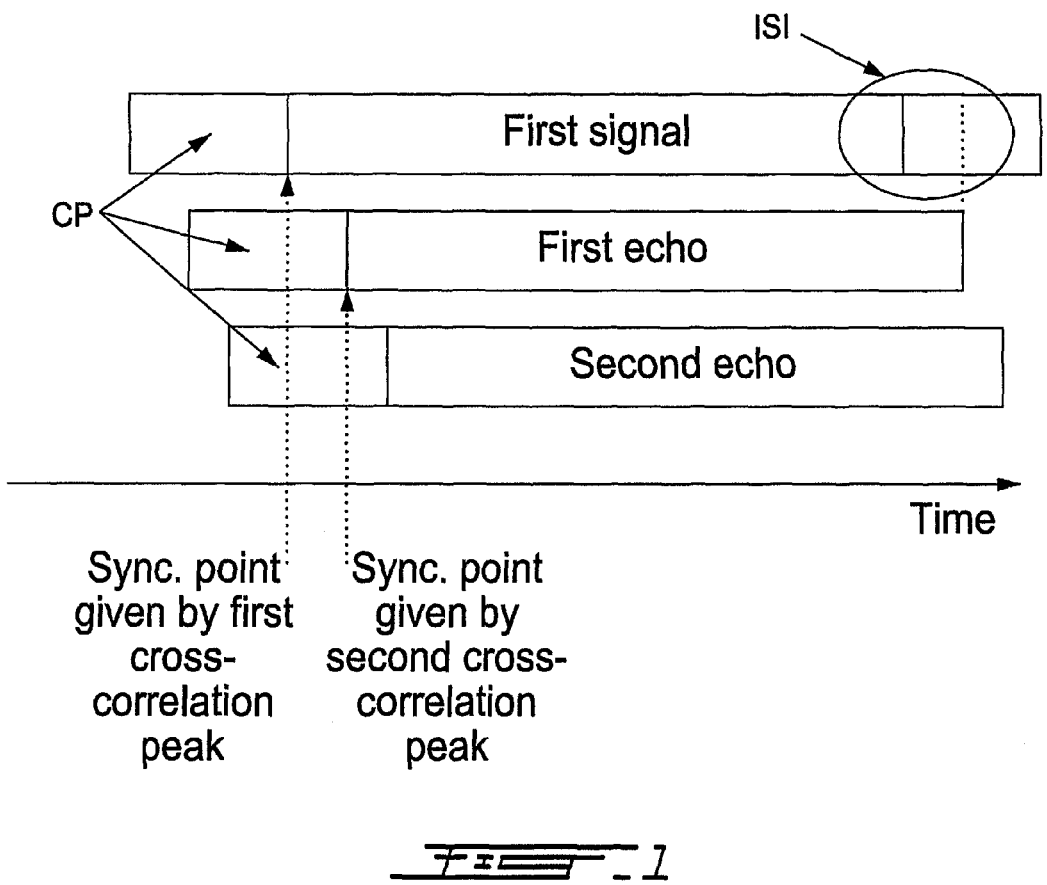
FIG. 1 is a graphical representation in time of a received signal and its echoes.
Figure 2:
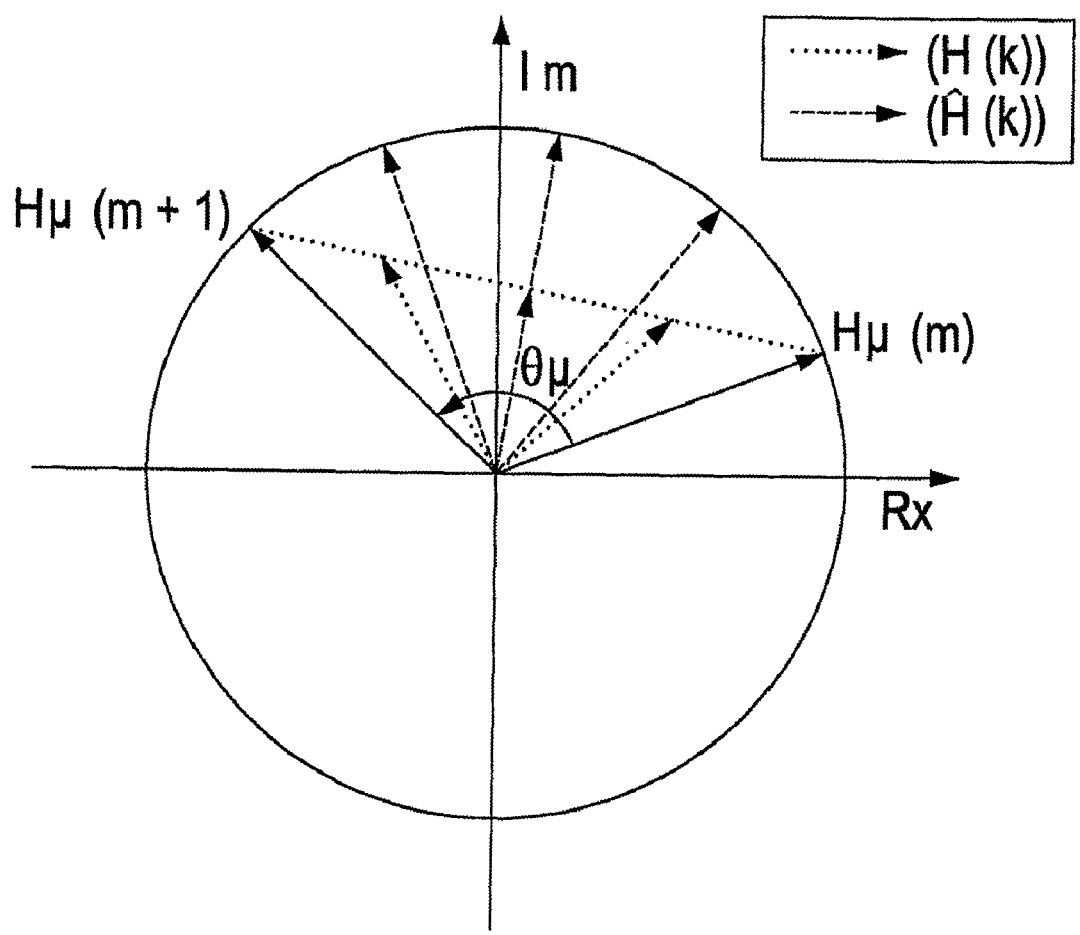
FIG. 2 is a graphical representation in a complex plan of an error of interpolation in presence of linear phase error or sampling error.
Figure 3:
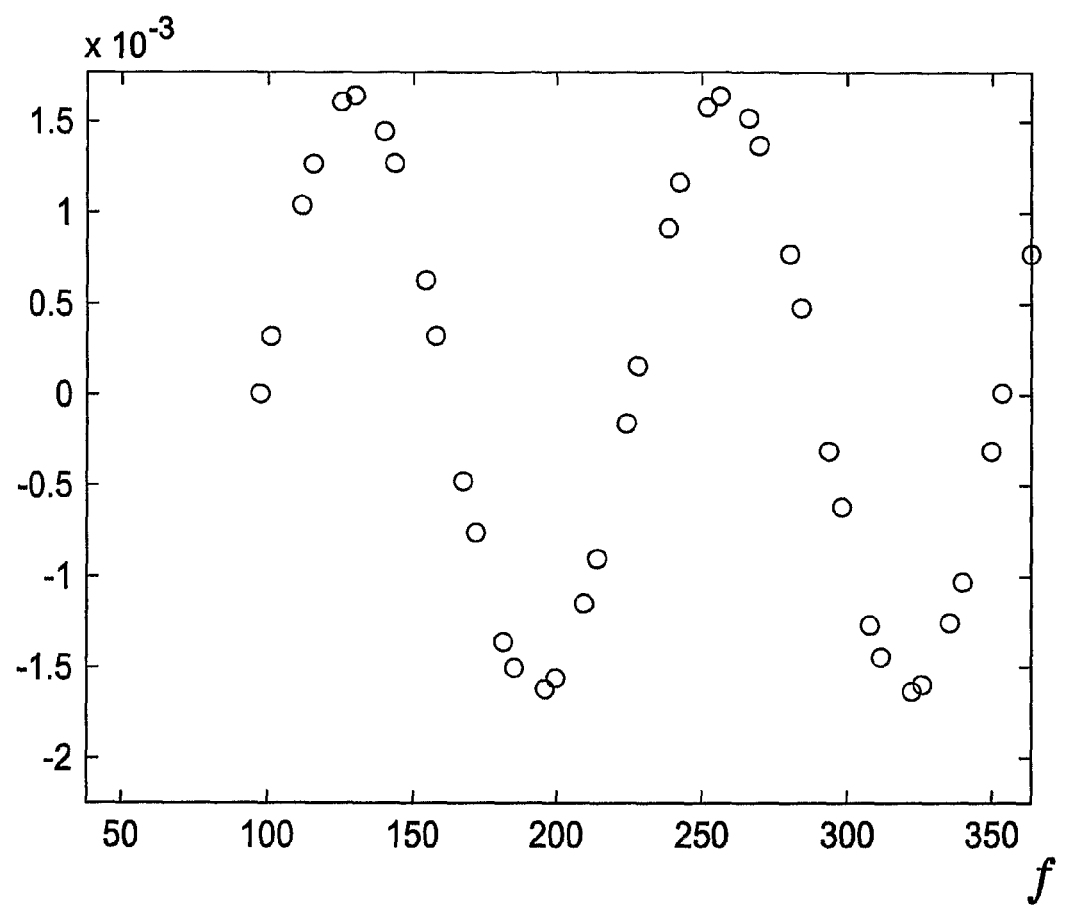
FIG. 3 is a graphical representation in a frequency domain of an effect of linear phase error over pilots of an OFDM signal.
Figure 4:
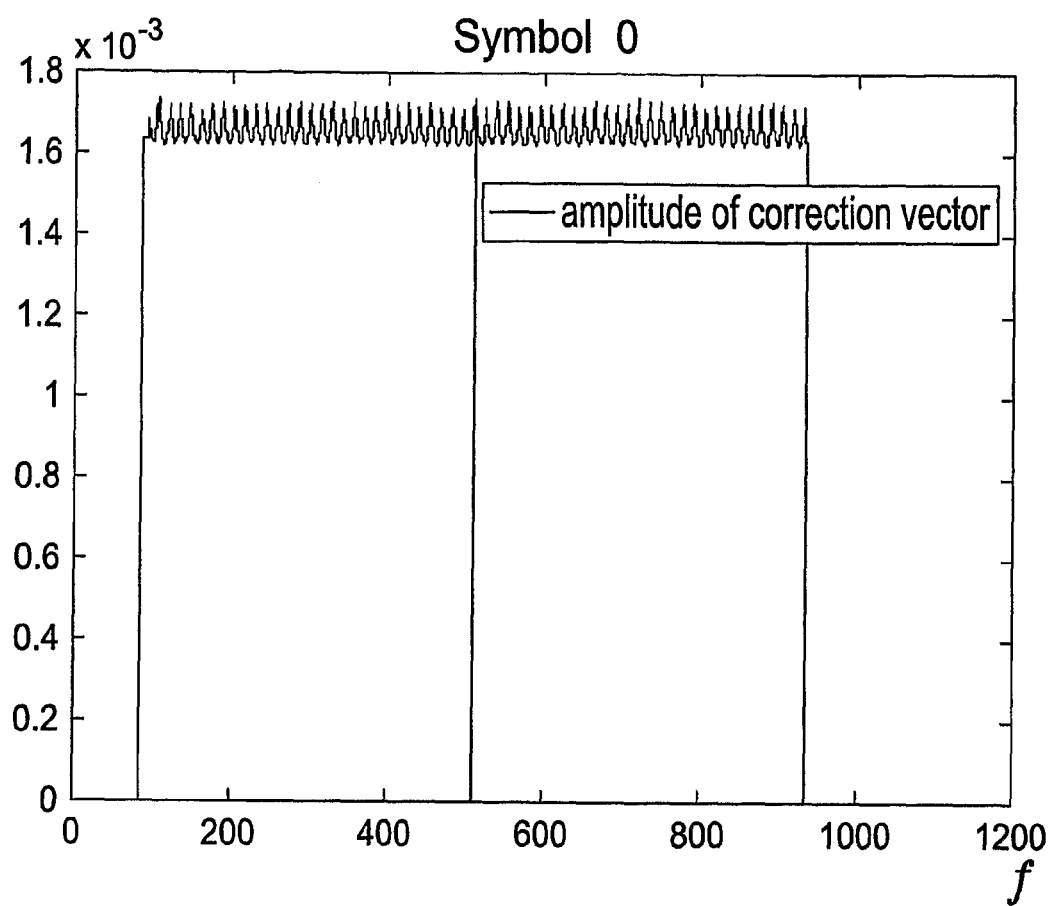
FIG. 4 is a graphical representation in a frequency domain of an effect of linear phase error on amplitude.

Linear error phase may be introduced in various manners in an OFDM signal. One such manner is caused by the selection of a synchronization point in multipath environments. Reference is now made to FIG. 1, which shows a representation in time domain of a first signal and its echoes, as typically received in a multipath environment. As demonstrated on FIG. 1, the received signal and its echoes are received simultaneously, but not in synchronicity in the time domain. Thus, the OFDM received signal typically is composed of the first signal and its echoes, superposed in the time domain. As OFDM signals include a cyclic prefix at the beginning thereof, which is a repeat of the end of the symbol, it is common practice to rely on the end of the cyclic prefix as synchronization point. But in the case of multipath, it is necessary to select a synchronization point that will allow proper demodulation of the OFDM signal, without introducing other errors such as inter-symbol interference. For example, if the selected synchronization point does not correspond to the end of the cyclic prefix of the first signal, but rather to the end of the cyclic prefix of the first echo, a back-off is introduced, which in turn results in a phase rotation between sub-carriers. An example of such phase rotation in the complex plan is shown in FIG. 2. FIG. 2 thus allows one skilled in the art to appreciate the error of interpolation in the presence of linear error phase, when classic linear interpolation is used. Reference is now also made to FIGS. 3 and 4, which respectively depict a graphical representation in a frequency domain of an effect of linear phase error over pilots of an OFDM signal, and a graphical representation in a frequency domain of an effect of linear phase error on amplitude. As can be appreciated in both FIGS. 3 and 4, linear phase error also has impacts on the pilots of the OFDM signal and on amplitude of a correction vector. More particularly, in the results shown on FIG. 3, the linear phase error results in pilots following a sinusoid, when in absence of linear phase error, such pilots would form a line.

Figure 5A:
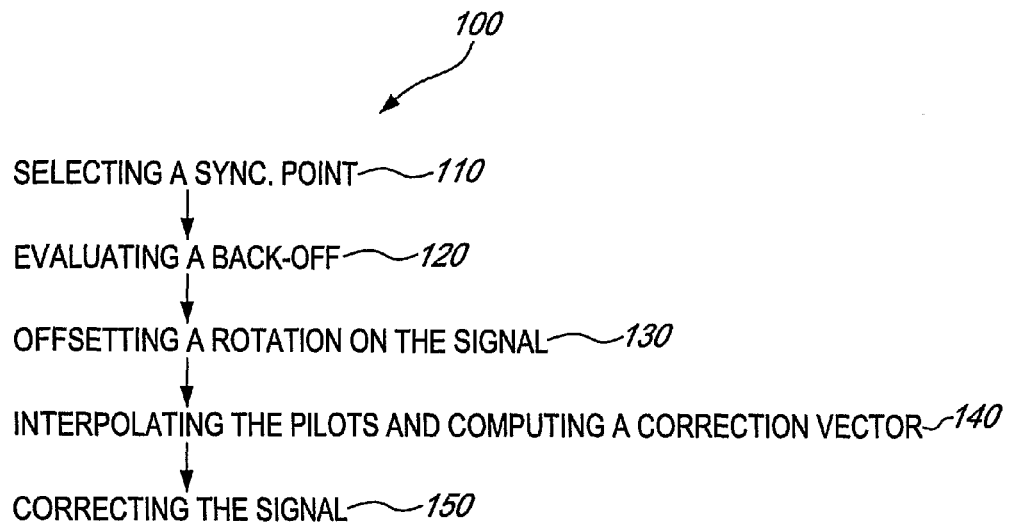
FIGS. 5a-5b are flowcharts of embodiments of methods for correcting linear error phase of an OFDM signal in accordance with an aspect of the present invention.

Reference is thus now made to FIG. 5a, which is a flow-chart of a method 100 for correcting linear error phase of an OFDM signal in accordance with a first embodiment of the present invention. In a general manner, the method 100 of the present invention corrects a linear phase error of the OFDM signal by offsetting a rotation corresponding to a back-off thereof.

In this first embodiment, the method of the present invention specifically starts with selecting a synchronization point at step 110. Then, the method proceeds with evaluating a back-off value at step 120. The back-off corresponds to a delay in a cyclic prefix of the OFDM signal. Various methods and techniques may be used to evaluate the back-off value. An exemplary technique will be described later on in more detail. The method of the present invention then continues with a step 130 of offsetting a rotation corresponding to the back-off value. For example, the offsetting step 130 could consist of adapting each OFDM symbol of the signal. As previously described, the rotation of the OFDM signal corresponds to the back-off value, which in turn results of a delay in the cyclic prefix for the selected synchronization point. Thus, the OFDM symbol is adapted in step 130 so as to de-rotate each OFDM symbol of the OFDM signal of an angle corresponding to the evaluated back-off value. The method then continues with interpolating pilots of the offset signal and computing a corresponding correction vector at step 140. The interpolating can be performed in any manner known in the art, such as for example, interpolating pilots of the signal. Afterwards, the method proceeds with correcting the signal using the correction vector at step 150.

Figure 5B:
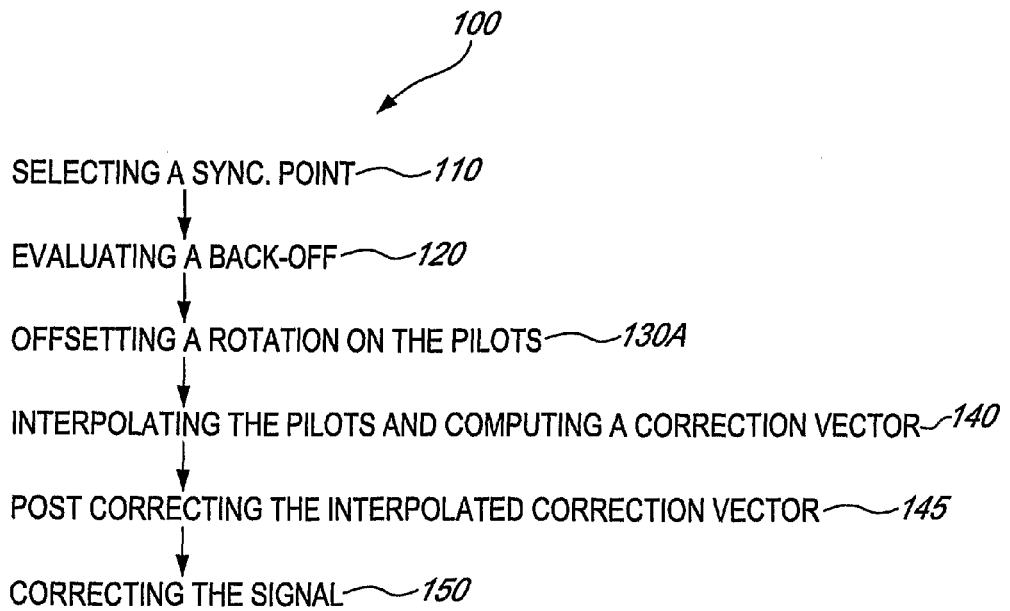

Reference is now made to FIG. 5b, which depicts a method for correcting linear error phase of an OFDM signal in accordance with a second embodiment. In this second embodiment, the method 100 starts with selecting the synchronization point at step 110. Then, the method pursues with evaluating the back-off in step 120. Afterwards, the method pursues with offsetting of the rotation corresponding to the back-off value on the pilots. Then, the method interpolates the pilots and computes a corresponding correction vector in step 140. The method continues with post-correcting the interpolated correction vector in step 145, which is followed by a step 150 of correcting the signal.

An exemplary method for selecting the synchronization point of step 110 and evaluating the back-off of step 120 is herein below described. This method is described only for exemplary purposes, as any method for selecting the synchronization point and evaluating the corresponding back-off could be used. For example, the synchronization point may be selected by auto-correlating the incoming signal, locating a plateau of the auto-correlated signal, auto-correlating a part of the plateau, and locating a peak on the obtained curve. Then, the method pursues with extracting of a reference waveform and cross-correlating the identified reference waveform in time domain, with the identified preamble. Afterwards, the method may sum the results of the cross-correlating step and then identify a suitable maximum peak. The method then proceeds with the computing of a threshold value. The threshold value could advantageously correspond to amplitude of the maximum peak of the cross-correlation, divided by a constant, for example k. The constant k could be set to different values, to correspond to various environments. For example, in the case of the urban and rural environments, the k parameter could vary greatly. The method then pursues with the identifying of peaks above the threshold and selecting one of the peaks above the threshold as the synchronization point. Finally, the back-off corresponds to the difference between the selected synchronization point and an index of the peak with the greatest amplitude.

Referring back to FIG. 5a, the first embodiment of the method of the present invention may proceed with offsetting the rotation of the OFDM symbol in step 130 using the following equation:

$$S_{ci} = S_i \times e^{j\theta i},$$

where:

$$\theta = d \times \frac{2\pi}{N};$$

$S_{ci}$ is the adapted OFDM symbol value, $S_i$ is the original OFDM symbol, d is the back-off value and i is a subcarrier index relative to Direct Current.

However, when the second embodiment of the method of the present invention is applied, the following equations is instead used to offset the rotation on the pilots at step 130a:

$$C_{pc} = C_p \times e^{j\theta p},$$

where:

$$\theta = d \times \frac{2\pi}{N};$$

$C_{pc}$ is the adapted correction vector value for pilot p, $C_p$ is an original correction vector, d is the back-off value and p is a pilot index relative to Direct Current. Consequently, the step 130b of post-correcting the interpolated signal is performed using the following equation:

$$C_m = C_{rm} \times e^{-j\theta m},$$

where: $C_{rm}$ is the correction vector obtained after interpolation, $C_m$ is the post-corrected correction vector, and m is the sub-carrier index relative to Direct Current.

It should be apparent to those skilled in the art that step 140 of correcting the signal is performed by using a correction vector corresponding to the interpolation method used in step 150. Thus, when the step 150 of interpolating performs interpolation of the pilots of the signal, the correction vector consists of a pilot correction value.

Turning now to the apparatus of the present invention, reference is now made to FIG. 6, which depicts a block diagram of the apparatus in accordance with a first aspect of the present invention. The apparatus 200 includes an input/output unit 210, a synchronization module 220, a correction module 230, an interpolation module 240 and a channel tracker module 250. The input/output unit 210 receives the OFDM signal to be corrected. It then forwards the OFDM signal to the synchronization module 220, which selects the synchronization point. The OFDM signal and the information on the synchronization point are provided to the correction module 230. The correction module 230 adapts an OFDM symbol so as to offset the linear phase error of the OFDM signal. More precisely, the correction module 230 evaluates the back-off for the synchronization point, adapts the OFDM symbol so as to offset the rotation of the signal corresponding to the back-off. Then, the corrected OFDM signal is provided to the interpolation module 240 for interpolating the corrected signal using pilots of the OFDM signal. The interpolated signal is then provided to the channel tracker module 250, which computes the channel frequency response with the interpolated signal.

Figure 7:
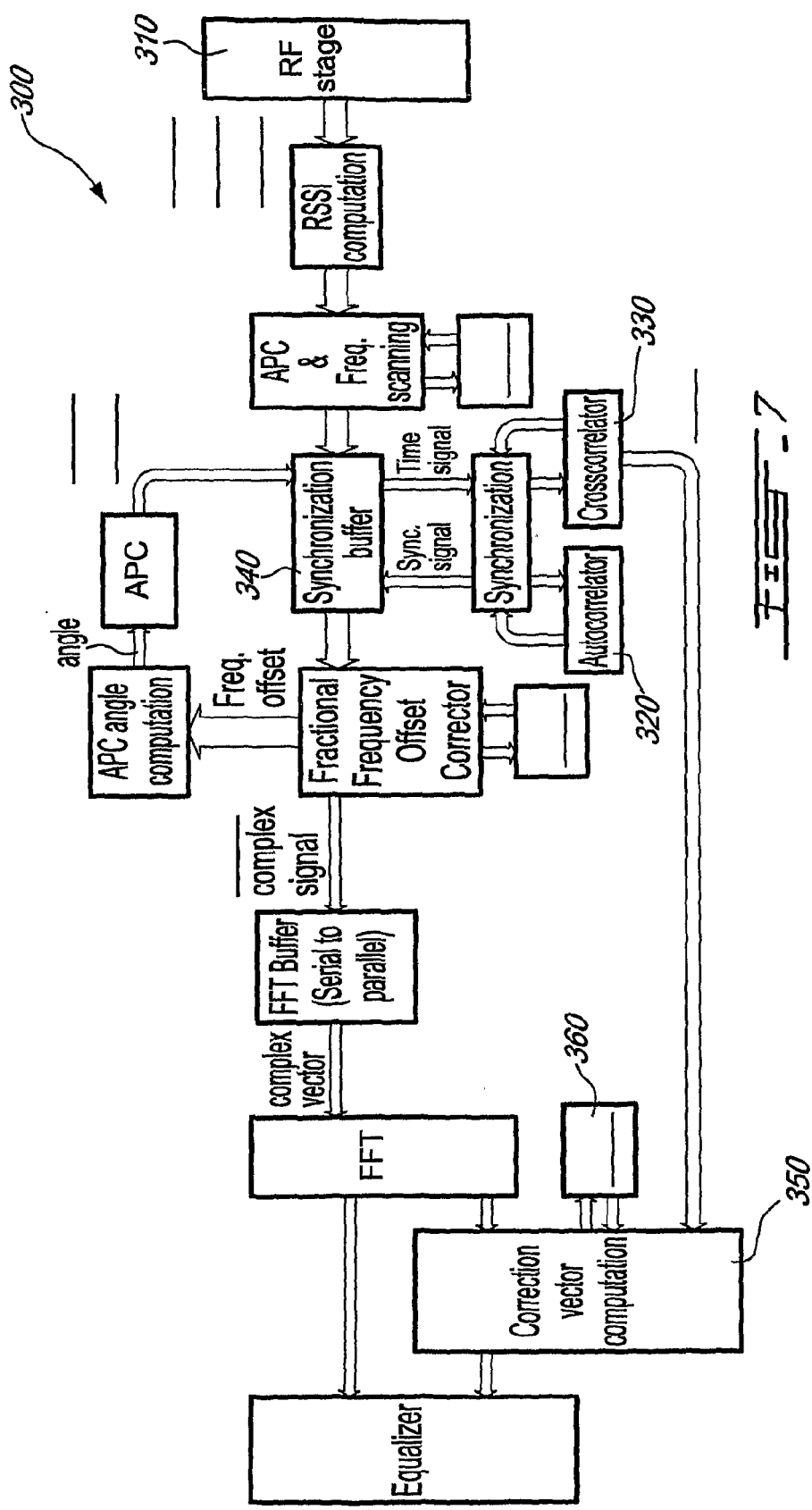
FIG. 7 is a block diagram of an apparatus in accordance with another aspect of the present invention.
Figure 8:
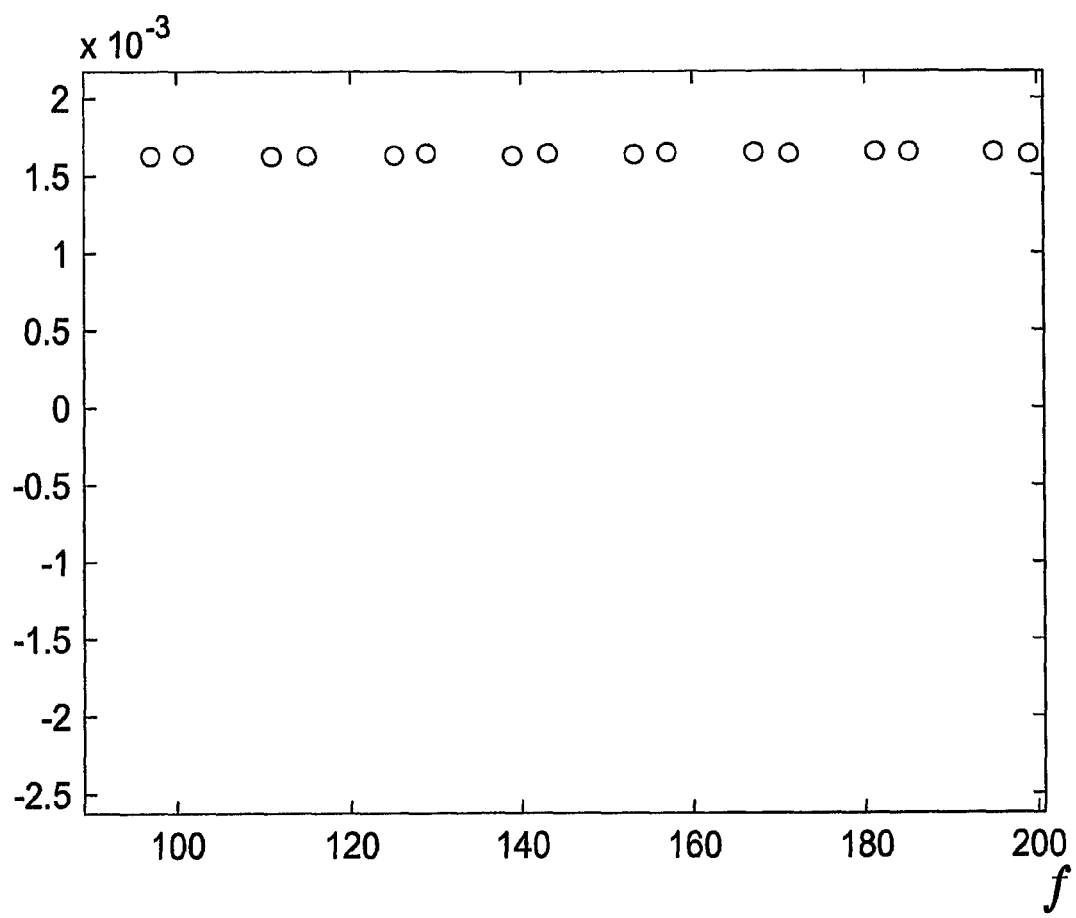
FIG. 8 is a graphical representation in a frequency domain of pilots of an OFDM signal after correction in accordance with an aspect of the present invention.
Figure 9:
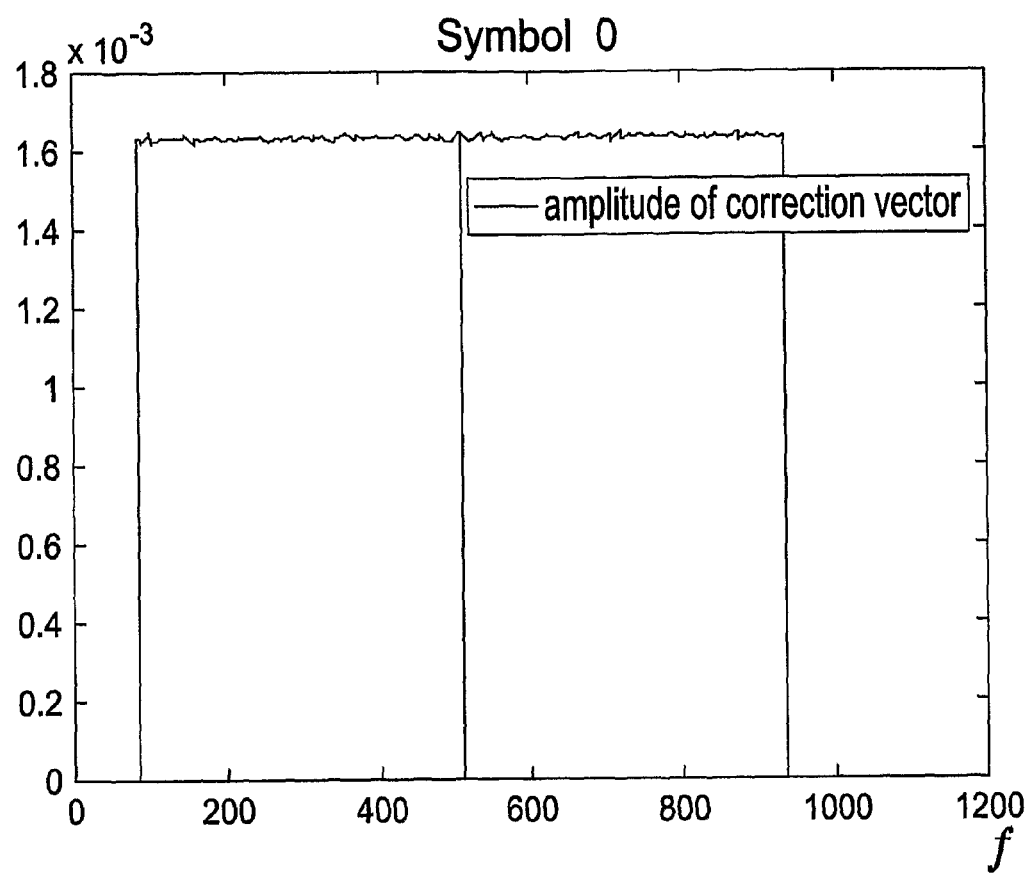
FIG. 9 is a graphical representation in a frequency domain of amplitude after correction in accordance with an aspect of the invention.

Reference is now made to FIG. 7, which represents a block diagram of an apparatus in accordance with another aspect of the present invention. In that other embodiment, the apparatus 200 is incorporated in an OFDM receiver 300. An input portion of the input/output module 210 is integrated within a Radio Frequency stage 310. The synchronization module 220 is composed of an auto-correlator 320 and a cross-correlator 330. Additionally, if desired, the synchronization module 220 may further include a synchronization buffer 340. The correction module 230 is composed of the Cordic 360 associated to a cordic slope computation module 370. The interpolation module 240 is included in the channel tracker 350, Reference is now made concurrently to FIGS. 8 and 9, which respectively depict a graphical representation in a frequency domain of pilots of an OFDM signal after correction, and a graphical representation in a frequency domain of amplitude after correction. As can be appreciated, the resulting pilots and amplitude have been corrected by the apparatus of the present invention, and the linear phase error has been corrected.

The present invention has been described by way of preferred embodiments. It should be clear to those skilled in the art that the described preferred embodiments are for exemplary purposes only, and should not be interpreted to limit the scope of the present invention. The method and apparatus as described in the description of preferred embodiments can be modified without departing from the scope of the present invention. The scope of the present invention should be defined by reference to the appended claims, which clearly delimit the protection sought.

The invention claimed is:

1. A method of correcting a linear error phase of an OFDM signal, the method comprising:
   selecting a synchronization point with a synchronization module;
   evaluating a back-off for the synchronization point with a correction module, wherein the back-off corresponds to a delay in a cyclic prefix of the OFDM signal; and
   offsetting, with the correction module, a rotation of the OFDM signal using the back-off value.

2. The method of claim 1, wherein the offsetting includes adapting each OFDM symbol of the OFDM signal to offset the rotation of the OFDM signal using the back-off value.

3. The method of claim 2, wherein the adapting of each OFDM symbol is performed using the following equation:

$$S_{ci} = S_i \times e^{j\theta i}$$

where:

$$\theta = d \times 2\pi / N$$

and:
   $S_{ci}$ is the adapted OFDM symbol value;
   $S_i$ is the original OFDM symbol;
   d is the back-off; and
   i is a subcarrier index relative to Direct Current.

4. An apparatus for correcting linear error phase of an OFDM signal, the apparatus comprising:
   a synchronization module to select a synchronization point; and
   a correction module to:
      evaluate a back-off for the synchronization point, wherein the back-off corresponds to a delay in a cyclic prefix of the OFDM signal, and
      offset a rotation of the OFDM signal using the back-off value.

5. The apparatus of claim 4, wherein the correction module corrects the OFDM signal with a correction vector to form a corrected signal.

6. The apparatus of claim 5, further comprising an interpolation module for interpolating the corrected signal.

7. The apparatus of claim 6, wherein the correction module adapts each of the OFDM symbols so as to de-rotate the signal.

8. The apparatus of claim 7, wherein the correction module adapts each of the OFDM symbols of the signal using the following equation:

$$S_{ci} = S_i \times e^{j\theta i}$$

where:

$$\theta = d \times 2\pi / N$$

and:
   $S_{ci}$ is the adapted OFDM symbol value;
   $S_i$ is the original OFDM symbol;
   d is the back-off; and
   i is a subcarrier index relative to Direct Current.

* * * * *